(12) United States Patent
Appelman et al.

(10) Patent No.: US 9,373,076 B1
(45) Date of Patent: Jun. 21, 2016

(54) SYSTEMS AND METHODS FOR BUILDING AND USING SOCIAL NETWORKS IN IMAGE ANALYSIS

(75) Inventors: Barry Appelman, New York, NY (US); Sharon M. Perlmutter, Pacific Palisades, CA (US); Keren O. Perlmutter, Pacific Palisades, CA (US)

(73) Assignee: AOL Inc., Dulles, VA (US)

( * ) Notice: Subject to any disclaimer, the term of this patent is extended or adjusted under 35 U.S.C. 154(b) by 2419 days.

(21) Appl. No.: 12/186,270

(22) Filed: Aug. 5, 2008

Related U.S. Application Data

(60) Provisional application No. 60/954,741, filed on Aug. 8, 2007.

(51) Int. Cl.
*G06K 9/00* (2006.01)
*G06N 5/00* (2006.01)
*G06F 17/30* (2006.01)

(52) U.S. Cl.
CPC .......... *G06N 5/003* (2013.01); *G06F 17/30244* (2013.01); *G06F 17/30247* (2013.01); *G06F 17/30283* (2013.01)

(58) Field of Classification Search
USPC ......... 382/100, 118, 176, 190, 209, 218, 224, 382/278, 282, 289, 290; 709/204–206; 706/21, 999.101, 999.104, 999.107
See application file for complete search history.

(56) References Cited

U.S. PATENT DOCUMENTS

| 7,092,584 | B2 | 8/2006 | Perlmutter et al. |
| 7,127,125 | B2 | 10/2006 | Perlmutter et al. |
| 7,362,919 | B2* | 4/2008 | Das et al. ...................... 382/284 |
| 7,451,161 | B2* | 11/2008 | Zhu et al. |
| 7,519,200 | B2* | 4/2009 | Gokturk et al. ............... 382/118 |
| 2003/0154212 | A1* | 8/2003 | Schirmer et al. .......... 707/103 R |
| 2006/0012677 | A1 | 1/2006 | Neven et al. |
| 2006/0018522 | A1* | 1/2006 | Sunzeri et al. ................ 382/118 |
| 2006/0112111 | A1 | 5/2006 | Tseng et al. |
| 2006/0120626 | A1 | 6/2006 | Perlmutter et al. |
| 2006/0218153 | A1* | 9/2006 | Voon et al. ...................... 707/10 |
| 2006/0251292 | A1 | 11/2006 | Gokturk et al. |
| 2006/0251339 | A1 | 11/2006 | Gokturk et al. |
| 2006/0253491 | A1 | 11/2006 | Gokturk et al. |
| 2007/0061022 | A1 | 3/2007 | Hoffberg-Borghesani et al. |
| 2007/0098303 | A1* | 5/2007 | Gallagher et al. ............ 382/305 |
| 2007/0136680 | A1 | 6/2007 | Skrenta |

(Continued)

OTHER PUBLICATIONS

Haung et al, Agent-Mediated Personal Photo Sharing, International Journal of Electronic Business Management, vol. 5, No. 1, pp. 11-18 (Mar. 2007).*

(Continued)

*Primary Examiner* — Andrae S Allison
(74) *Attorney, Agent, or Firm* — Finnegan, Henderson, Farabow, Garrett & Dunner, LLP

(57) ABSTRACT

Computer-implemented systems and methods for identifying an object in an image are provided. In one example, the method includes identifying a first object related to an electronic image. The image includes at least a second object. Based at least in part on the identity of the first object, social networking information related to the first object is used to programmatically identify the second object. The first object and/or the second object may be a person. In some embodiments, metadata associated with the image may be used to identify the second object. Based at least in part on the identifications, social networking information may be associated between the first object and the second object.

20 Claims, 10 Drawing Sheets

(56) References Cited

U.S. PATENT DOCUMENTS

| | | | |
|---|---|---|---|
| 2007/0177805 A1* | 8/2007 | Gallagher | 382/190 |
| 2007/0239778 A1* | 10/2007 | Gallagher | 707/104.1 |
| 2007/0258645 A1 | 11/2007 | Gokturk et al. | |
| 2008/0080745 A1 | 4/2008 | Vanhoucke et al. | |
| 2008/0089609 A1 | 4/2008 | Perlmutter et al. | |
| 2008/0144943 A1 | 6/2008 | Gokturk et al. | |
| 2008/0152231 A1 | 6/2008 | Gokturk et al. | |
| 2008/0270425 A1* | 10/2008 | Cotgreave | 707/100 |
| 2009/0192967 A1* | 7/2009 | Luo et al. | 706/47 |
| 2010/0106573 A1* | 4/2010 | Gallagher et al. | 705/14.4 |
| 2010/0245567 A1* | 9/2010 | Krahnstoever et al. | 348/143 |

OTHER PUBLICATIONS

Evision, LLC, A Technical White Paper from eVision, "A New Vision for Internet Search," Jul. 2001.

Liu, Hugo, and Maes, Pattie, "InterestMap: Harvesting Social Network Profiles for Recommendations," Proceedings of IUI Beyond Personlization 2005: A Workshop on the Next Stage of Recommender Systems Research, Jan. 9, 2005.

* cited by examiner

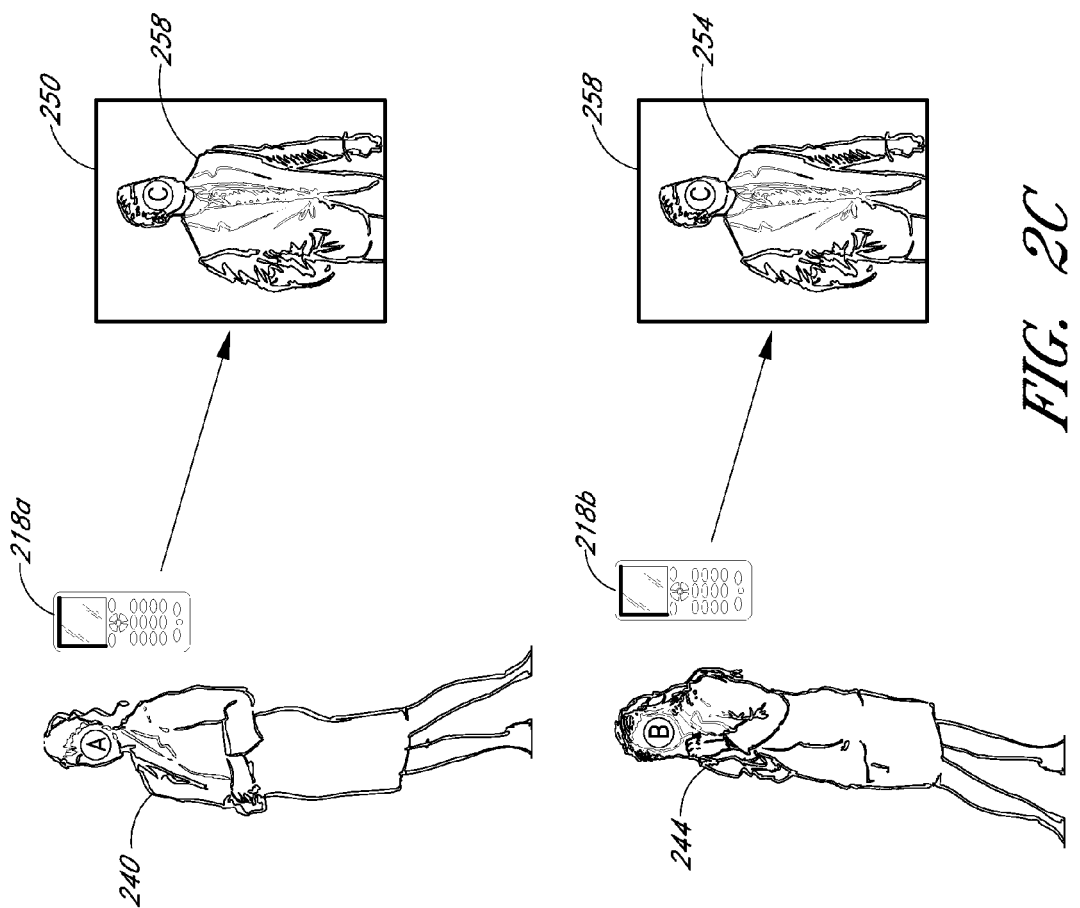

Sarah Richards

Senator Dan Smith (front row, center) is pictured with staff John Adams, Jane Brandeis and Clarence Nguyen (back row, from left to right)

Person B, Person A, Person C

Person C, Person B, Person D, Person A

SYSTEMS AND METHODS FOR BUILDING AND USING SOCIAL NETWORKS IN IMAGE ANALYSIS

CROSS-REFERENCE TO RELATED APPLICATIONS

This application claims the benefit under 35 U.S.C. §119(e) of U.S. Provisional Patent Application No. 60/954, 741, filed Aug. 8, 2007, entitled "SYSTEMS AND METHODS FOR BUILDING AND USING SOCIAL NETWORKS IN IMAGE ANALYSIS," the entirety of which, including all claims, is hereby incorporated by reference herein.

BACKGROUND

1. Field

The present disclosure relates to computer-implemented methods for using and generating information, such as social network information, by analyzing images (e.g., digital photographs) and image metadata found in web pages, videos, and other types of informational content.

2. Description of the Related Art

With the wide availability of digital cameras (e.g., in mobile telephones), individuals are recording and sharing digital photographs (and videos) more than ever before. Individuals commonly store images on their home and work computers as well as sharing them with friends and family on image sharing websites. As the size of digital image collections grows, efficient search and retrieval of desired images has become more important. Some image processing applications and websites provide image search and retrieval capabilities, for example, using text-based searches for textual content associated with images. Current applications and websites suffer from disadvantages.

SUMMARY

Because of the limitations of current applications and websites, computer-implemented systems and methods for identifying an object in an image are provided. In one illustrative example, the method includes identifying a first object related to an electronic image such as, e.g., a still photograph or a video. The image includes at least a second object. Based at least in part on the identity of the first object, social networking information related to the first object is used to programmatically identify the second object. The first object and/or the second object may be a person. In some embodiments, metadata associated with the image may be used to identify the second object. Based at least in part on the identifications, social networking information may be associated between the first object and the second object.

In an embodiment of a computer-implemented method for improving recognition of a face in an image, the method comprises detecting a face of a person in an image, using a computer executing a facial recognition algorithm to determine facial recognition information associated with the detected face, determining social relationship information associated with the detected face of the person, the social relationship information based on at least one of (i) other detected faces in the image and (ii) metadata associated with the image, and updating the facial recognition information associated with the detected face of the person based at least in part on the social relationship information.

In an embodiment of a computer-implemented method for identifying a person in an image, the method comprises using a computer to detect at least one face in an electronic image, each detected face associated with a person, searching metadata associated with the image for identification information related to at least one person in the image, and associating the identification information with the detected face of the person.

In an embodiment of a computer-implemented method of building a social network based on content in images, the method comprises identifying a first person related to an electronic image, using a computer system to detect an object in the image, and associating social network information between the first person and the object. In an embodiment, the method further includes storing, in computer storage, the social network information between the first person and the object.

In an embodiment of a computer-implemented method of using a social network to search for an object in a collection of objects, the method comprises receiving information on an object to be programmatically searched for in a collection of objects, wherein each object in the collection is associated with at least one person in a social network, and the social network includes picture distances relating different persons in the social network. The picture distances may be stored in computer storage. The method also includes receiving an input identifying a first person in the social network and receiving a picture distance limit that represents a maximum picture distance from the first person in the social network. The method also includes identifying a group of persons in the social network such that persons in the group have a picture distance from the first person that does not exceed the picture distance limit and identifying the object in a subset of the collection of objects, wherein the subset includes the objects associated with persons in the group of persons.

In an embodiment of a computer-implemented method of identifying an object in a video, the method comprises using a computer to determine an object in at least a first frame of a video, determining metadata associated with the video in a window that includes the at least first frame, identifying a first person from the metadata, and determining identification information for the object based at least in part on social networking information related to the first person.

In an embodiment of a computer-implemented method of identifying a person in a video, the method comprises using a computer to identify a first person in at least a first frame of a video, detecting a second person in at least a second frame of the video, and based at least in part on the identity of the first person, using social networking information related to the first person to identify the second person.

In an embodiment of a computer-implemented method for identifying an object in an image, the method comprises identifying a first object related to an electronic image, where the image includes at least a second object, and based at least in part on the identity of the first object, using social networking information related to the first object to programmatically identify the second object. In some embodiments, in response to programmatically identifying the second object, the method further comprises storing, in computer storage, information that associates the second object with the electronic image. The first object, the second object, or both the first object and the second object may be a person.

In an embodiment of a computer-implemented method of building a social network based on content in images, the method comprises identifying a first object related to an electronic image, using a computer to detect a second object in the image, and associating social network information between the first object and the second object. The first object, the second object, or both the first object and the second object may be a person.

Embodiments of any of the disclosed methods may be stored on or embodied as computer-executable instructions on a computer-readable medium. Also, computer systems may be programmed to perform embodiments of any of the methods disclosed herein.

In an embodiment of a system for identifying an object in an image, the system comprises an object identification module configured to identify a first object related to an electronic image, where the image including at least a second object. The system also comprises a storage device configured to communicate with the object identification module and to store data related to the image and social networking data related to the first object. The object identification module is further configured to identify the second object based at least in part on the social networking data.

In an embodiment of a system for improving recognition of a face in an image, the system comprises a storage device configured to store data related to an electronic image and social relationship information and a facial recognition module configured to communicate with the storage device. The facial recognition module is further configured to determine facial recognition information associated with a detected face in the image, and to determine social relationship information associated with the detected face of the person. The social relationship information may be based on at least one of (i) other detected faces in the image and (ii) metadata associated with the image. The facial recognition module is further configured to update the facial recognition information associated with the detected face of the person based at least in part on the social relationship information.

In an embodiment of a system for using social network information, the system comprises an image analyzer configured to detect content in an image, a metadata extractor configured to extract image metadata associated with the detected content in the image, and a data repository configured to store information associated with the image. The stored information includes at least one of information associated with the detected content, information associated with the extracted image metadata, or social network information. The system also includes a social network analyzer configured to communicate with the image analyzer, the metadata extractor, and the data repository. The social network analyzer is further configured to use information from at least one of the image analyzer, the metadata extractor, or the data repository to determine social network information from the detected content in the image or the extracted image metadata.

BRIEF DESCRIPTION OF THE DRAWINGS

FIGS. 2A-2C provide illustrative examples indicating social network information comprising a "degree of separation."

Figure 1A:
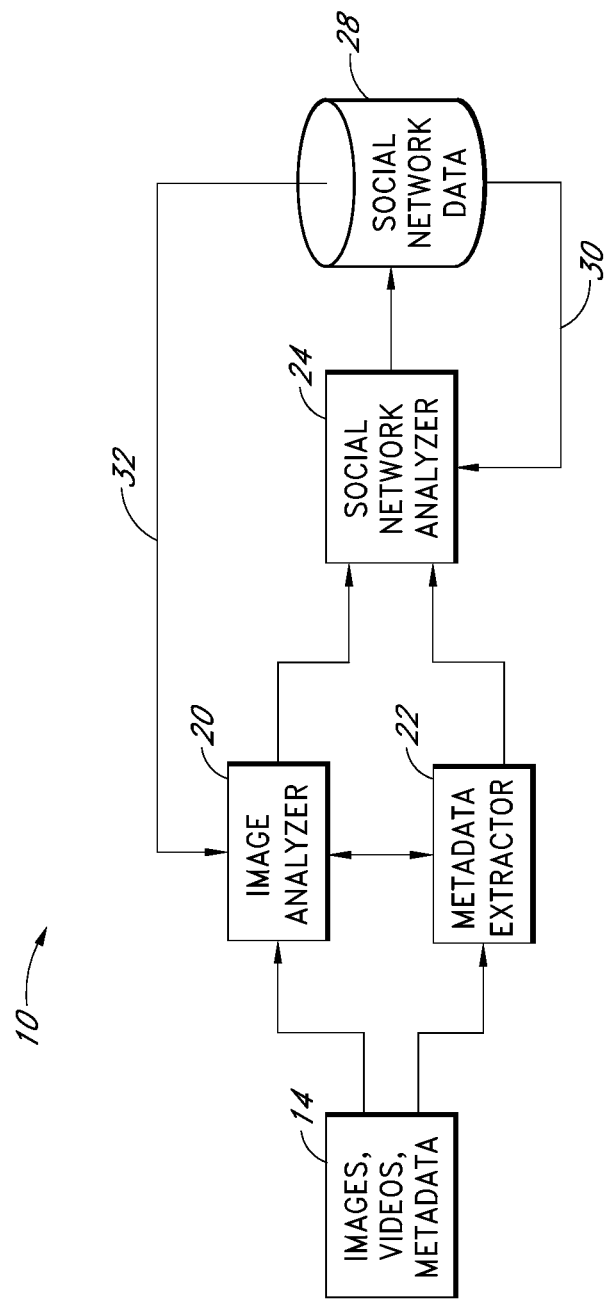
FIG. 1A is a block diagram that schematically illustrates an embodiment of a system that uses and generates social network information.

These and other features will now be described with reference to the drawings summarized above. The example embodiments described herein have several features, no single one of which is indispensible or solely responsible for their desirable attributes. The drawings and the associated descriptions are provided to show embodiments and illustrative examples and not to limit the scope of the claimed inventions.

DETAILED DESCRIPTION OF PREFERRED EMBODIMENTS

A. Overview

Social networks may be used to analyze or categorize social relationships among individuals (or groups) within any suitable social structure. Generally, individuals in a social network are linked by one or more types of commonality, interdependency, or association. For example, individuals may be related in a social network by family ties, friendship, or membership in organizations. A social network may include individuals having shared likes/dislikes, health or medical conditions, interests, goals, characteristics, and so forth. Social networks may be defined in terms of business and/or financial relationships, geographical location, demographics, etc. A social network may be generally thought of as a map of one or more relevant links between individuals in a group.

Social networks can be defined for individuals, groups of individuals, organizations, or any type of group having one or more interdependencies or interrelationships. One or more metrics (or measures) may be defined for a social network to quantitatively or qualitatively represent a degree of connectedness between one or more individuals in the network. For example, in some social networks, a "degree of separation" can be used to categorize the links between members of the network. Examples of degrees of separation will be further described below.

Social network information advantageously may be used to analyze content in images. For example, social network information may be used (at least in part) to determine the identity of an object in an image (e.g., a name of a person) and/or to narrow a search for an object in a collection of objects (e.g., images of friends of a particular person in a collection of photographs). Relationships between objects in the image may be used to generate or augment social network information. For example, In a non-limiting example scenario, a person may take a digital photograph using a camera on a mobile phone. The digital photograph may be uploaded via a data network (e.g., the Internet, a mobile-phone provider's data network, an organization's intranet, etc.) to a website such as, for example, a social networking website, a dating website, a photo-sharing website, a celebrity look-a-like website, etc. One or more persons, as well as other objects, may be included in the digital photograph. For example, the persons in the photograph may be friends of the person who took the photo. In some cases, social networking information for individuals identified in the photograph may be used to identify (or narrow down possible identities) for an unidentified person in the photograph. Objects in the photograph may provide information about when and/or where the photograph was taken. For example, the persons in the photograph may be standing in the Lincoln Memorial in Washington, D.C. In another example, a street sign in the photograph may indicate an address. Such information may be used to identify other objects in the photograph. Additionally, the digital photograph may be associated with metadata that includes, for example, a name of the person who took the photograph, a name of the person who uploaded the photograph to the network, a geographic location where the photograph was taken, a time when the photograph was taken, and so forth. In some cases, the digital photograph may appear on a webpage that has information related to the persons (and/or objects) in the photograph, which may be used to identify objects in the photograph or to provide additional links in a social network. This example scenario is intended to provide illustrative context for certain embodiments of the disclosed systems and methods and is not intended to limit the scope of the disclosure.

As will be further described herein, social network information may be associated between different persons appearing in the photograph, between persons in the photograph and persons determined from the metadata, and between different persons determined from the metadata. Also, social network information may be determined from objects that appear in the photograph (and/or are described in the metadata associated with the photograph). Moreover, the social network information determined from analysis of the digital photograph and its associated metadata may be used to build or augment additional social networks by analyzing any social network relationships between the persons (and/or objects) determined from the image/metadata and any other persons (and/or objects).

Accordingly, embodiments of the systems and methods described herein may be used to analyze image content and build (or augment) a database of social network information that links content related to images. The database of social network information (and or the images) may be stored in a data repository. Certain embodiments include a social network analyzer that utilizes image data, extracted metadata (if present), and information from the social network database, at least in part, to identify objects in images, to limit or restrict the scope of searches for information, and for many other purposes.

In one embodiment, an image analyzer performs facial analysis on one or more images to determine facial recognition information for one or more faces detected in the image. The facial recognition information may be supplemented with extracted information from image metadata to infer or determine relationships between people. For example, the people may include one or more persons detected within an image and/or one or more persons identified from the extracted image metadata. Implied or indirect associations may be used to identify relationships among people, and such associations can be used to augment the social network database.

B. Example Systems and Methods for Using Social Network Information in Image Analysis FIG. 1A is a block diagram that schematically illustrates an embodiment of a system 10 that uses and generates social network information. The system 10 operates generally by analyzing electronic content 14 including web pages, video streams, digital photographs, and/or any other sources of image content. This embodiment of the system 10 comprises an image analyzer 20, a metadata extractor 22, a social network analyzer 24, and a data repository 28. In the case of web pages, the system 10 may include a web crawler component (not shown) that crawls web sites to locate web pages that are suitable for analysis. For example, the system 10 may be capable of crawling a social networking site (such as, e.g., MySpace.com) to locate web pages that include digital photographs and other context associated with users of the social networking web site. The system 10 may include a website interface (not shown) that allows users to upload image content for analysis by the system 10. In some embodiments, image content 14 may be uploaded via a mobile telephone provider's data network. By analyzing the image content 14, which may include image data and/or image metadata, the system 10 may, for example, detect various types of relationships between individuals (and/or objects) shown and described in such images. The detected relationships may be added to a database of known relationship information to build (or update) a social network database ("people database"). The information in the social network database may be used to identify individuals (and/or objects) in uploaded images, narrow searches for matches to image content, and so forth.

As schematically illustrated in FIG. 1A, this embodiment of the system 10 includes an image analyzer 20 that analyzes the electronic content 14 and outputs information regarding objects identified in the content 14. The image analyzer 20 may include a facial recognition program or system capable of detecting faces in images and capable of assessing whether two or more images are of the same person. Any suitable facial recognition program may be used for this purpose. For example, the image analyzer 20 may determine facial recognition feature vectors for detected faces in the images. In some embodiments, the image analyzer 20 is capable of detecting non-facial objects in the images. As illustrated in FIG. 1A, the image analyzer 20 outputs information about objects detected in the analyzed images. This information may, for example, specify the number of faces or other objects found, whether these objects are recognized, a degree of confidence in such recognition, etc.

The example system 10 also includes a metadata extractor 22 that extracts image metadata from images and/or from metadata associated with the image (e.g., a caption to a digital photograph). For example, in the case of digital images on a web page, the metadata extractor 22 may identify image captions associated with particular images and may identify other text in the vicinity of such images. The metadata extractor 22 may analyze the metadata for information related to content in the images such as, for example, names of persons in the images. In the case of video content (e.g., in which a stream of images is accompanied by a stream of audio), the metadata extractor 22 may use voice recognition algorithms on the audio content to generate information that corresponds to particular images. For example, the metadata extractor 22 may analyze portions of an audio track that are near in time to frames of the video in which persons are detected. The image extractor 20 may tag various detected objects with information determined from the metadata extractor 22. For example, a detected object may be tagged with information regarding where, when, or how such objects were found or recognized (e.g., information in a caption, in non-caption web page text, a mobile phone number used to upload the image, geographic information for the image or for where the image was uploaded, etc.). Detected objects may be tagged with any other suitable data including, for example, demographic information (e.g., estimated age, gender, race, ethnicity, etc.).

In the embodiment illustrated in FIG. 1A, a social network analyzer 24 analyzes the data generated by the image analyzer 20 together with corresponding image metadata information, if any, generated by the metadata extractor 22. The social network analyzer 24 may use data from one or both the image analyzer 20 and the metadata extractor 22 to generate various types of social network data. As described above, social network data may include data that links persons and/or other objects through one or more associations including, for example, families, friends, organizations, formal or informal groups having shared likes/dislikes, interests, goals, characteristics, or any other suitable commonality. Various inventive methods that may be used by the social network analyzer 24 to perform this task are described in this disclosure. As will be recognized, these methods may be embodied individually or in any combination within a particular implementation of the social network analyzer 24. In various embodiments, the system 10 may include one or both of the image analyzer 20 and the metadata extractor 22, and the social network analyzer 24 may use data (if any) from one or both of these components.

As schematically illustrated in FIG. 1A, the data generated by the social network analyzer 24 may be stored in a repository 28 such as a database. The repository 28 may include any type of magnetic, electronic, or optical storage. This data may be used for various purposes, such as to improve facial recognition reliability or to assist users in locating other users with similar interests or characteristics. As illustrated by the feedback path 30, the social network analyzer 24 may take existing social network data into consideration when analyzing data regarding new content 14. In some embodiments, as illustrated by the feedback path 32, the image analyzer 20 may use social network information to improve recognition of objects in images. For example, existing social network information may increase the likelihood of correct identification of a person in an image. In certain embodiments, the system can also utilize other types of data (e.g., geographic information, time information, gender, race, ethnicity, nationality, etc.). Such other types of data may be stored in the repository 28 or in one or more separate repositories.

Figure 1B:
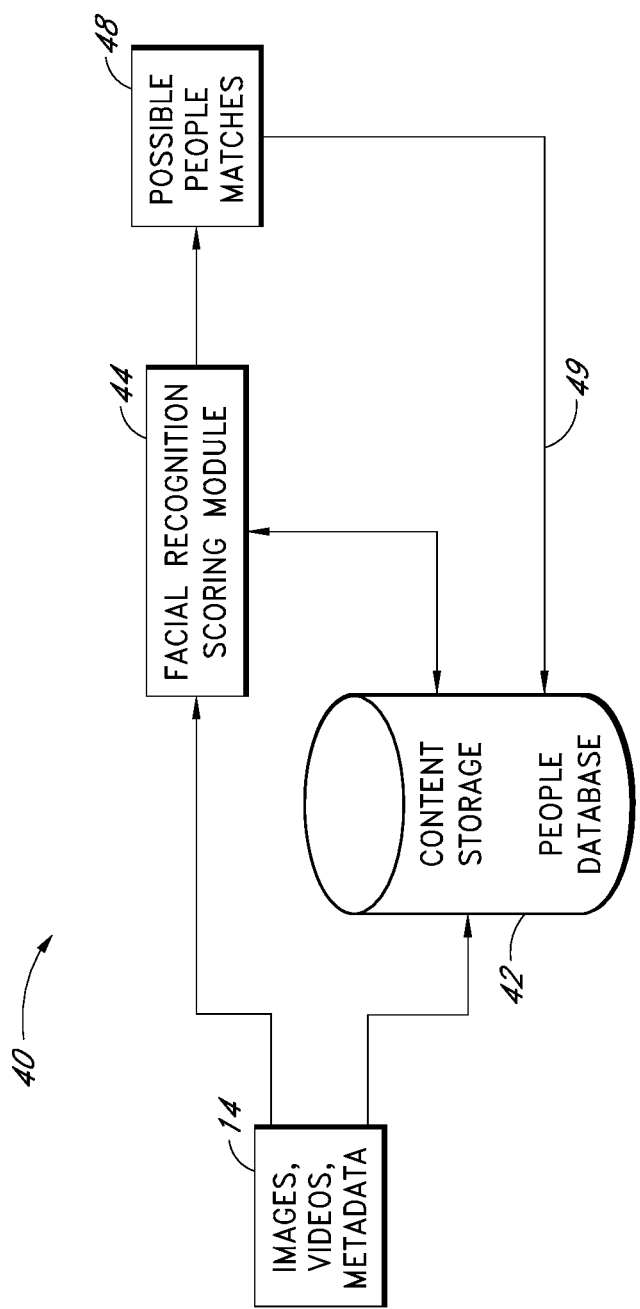
FIG. 1B is a block diagram that schematically illustrates an embodiment of a system that uses social network information and/or other metadata to improve the probability of facial recognition in an image.

FIG. 1B is a block diagram that schematically illustrates an embodiment of a system 40 that uses social network information and/or other metadata to improve the probability of facial recognition in an image. In this example embodiment, a person may upload electronic content 14 (e.g., an image) to the system 40 via a data network such as, for example, the Internet, a mobile phone network, etc. The system 40 includes a facial recognition scoring module 44 and a data storage system 42. The storage system 42 may be used to store images, image metadata, and/or a people database. The storage system 42 may include one or more storage subsystems that are physically remote from each other. The storage system 42 may comprise any suitable storage medium including magnetic, electronic, and/or optical storage. The facial recognition scoring module 44 uses a facial recognition algorithm to determine facial recognition information associated with a detected face in the image. Social networking information and/or other tags (e.g., image metadata, mobile phone number, gender, race, ethnicity, nationality, etc.) may be input into the facial recognition scoring module 44. In some embodiments, this information is stored on the storage system 42 for use in analysis of other images. The facial recognition scoring module 44 determines social relationship information associated with the detected face of the person in the image. The social relationship information may be based on other detected faces in the image, metadata associated with the image, and/or other tags. The facial recognition scoring module 44 analyzes this information and updates the facial recognition information associated with the detected face of the person based at least in part on the social relationship information. The updated facial recognition information may comprise possible people matches 48 to the detected face in the image. In some embodiments, the facial recognition scoring module 44 updates a confidence score associated with the likelihood of a correct match to the detected face in the image. Accordingly, embodiments of the system 40 advantageously may increase the probability of facial recognition in the electronic content 14. As indicated by feedback path 49, the possible people matches 48 may be used to generate or augment social networks in the people database.

The components of the example system 40 shown in FIG. 1B (or other systems such as, e.g., the system 10 shown in FIG. 1A), and the various computer-implemented methods described herein, may be embodied in software code modules executed by one or more general purpose or special purpose computer systems, including systems that are distributed on a local or wide area network, but may alternatively be implemented in-whole or in-part in hardware such as microprocessors, application-specific integrated circuits (ASICs), field-programmable gate arrays (FPGAs), and/or programmable logic devices (PLDs). In some embodiments, some of the computer systems are physically separated from each other and may communicate over a data network. The software code modules may be stored on any type of computer-readable medium or other suitable computer storage device. The example systems 10 and 40 shown in FIGS. 1A and 1B may utilize additional and/or different components than described herein. For example, in some embodiments, several components may be combined so that their functions and processes are implemented in a single processor or software module, while in other embodiments, their functions and processes may be shared among several different components and/or software modules. All of the processes described herein may be fully automated, and the results of these processes (e.g., data that associates one person with another, or which associates a person with a particular image or portion of an image) may be recorded in computer storage.

Figure 1C:
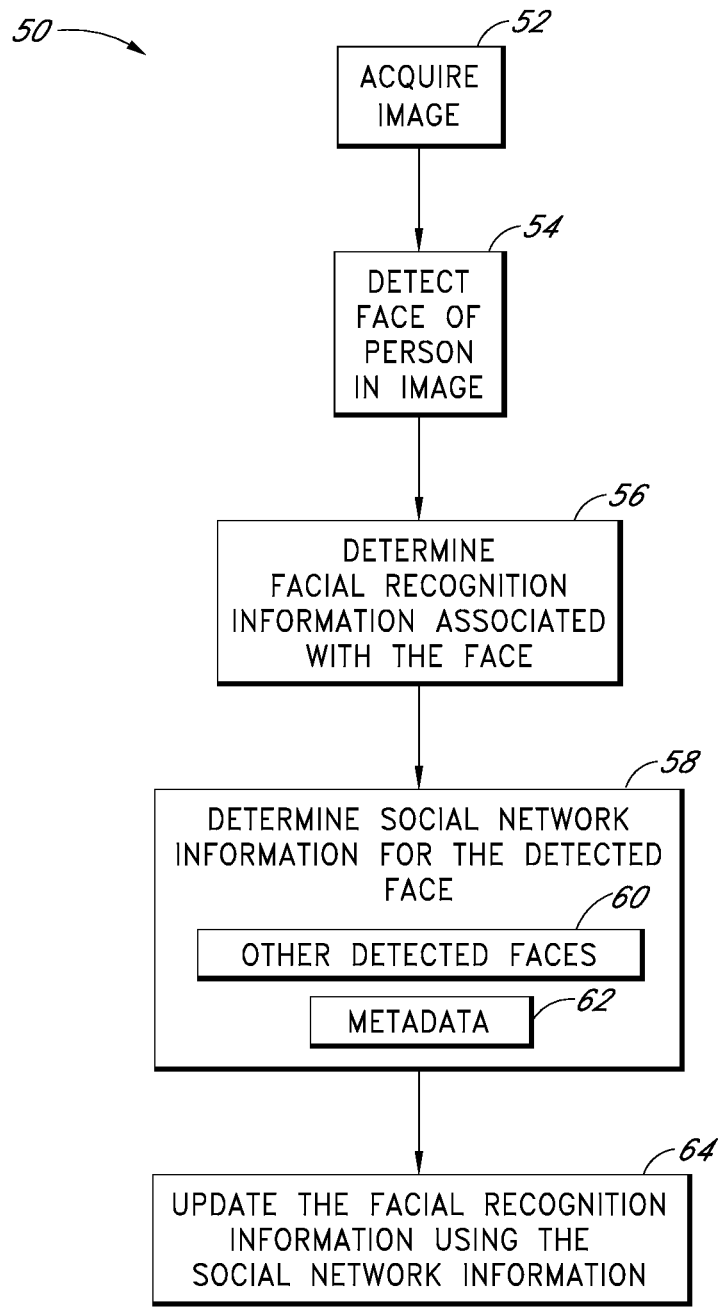
FIG. 1C is a flowchart that schematically illustrates an embodiment of a method for improving recognition of a face in an image.

FIG. 1C is a flowchart that schematically illustrates a non-limiting, example embodiment of a computer-implemented method 50 for improving recognition of a face in an image. In block 52, a digital image is acquired, for example, by uploading to embodiments of the systems 10 and 40. In block 54, a facial recognition program is used to detect a face of a person in the image. For example, the image analyzer 20 or the facial recognition scoring module 44 may be used in some embodiments of the method 50. In block 56, the facial recognition program is used to determine facial recognition information associated with the detected face. Facial recognition information may include, for example, facial recognition vectors (e.g., "eigenfaces"), feature vectors in a feature space, facial recognition scores or probabilities, or any other suitable facial recognition metric. In block 58, social network information associated with the detected face is determined. The social network information may be based at least in part on other detected faces in the image and/or metadata associated with the image. For example, social networks for other individuals in the image may be used to identify the detected face or to increase the likelihood of such identification (e.g., by narrowing possible matches to the detected face). In some cases, image metadata (e.g., captions) may provide the social networking information. In block 64, the social network information is used (at least in part) to update the facial recognition information for the detected face. In some embodiments, a facial recognition score that represents likelihood of identification may be increased based on the social network information. The facial recognition information may be used to identify possible matches to the detected face. In certain embodiments, if the detected face is identified (e.g., by having a sufficiently high facial recognition score), the social networks of the identified persons in the image may be updated to reflect the association of the identified persons at least by virtue of their being in the same image.

C. Building and Using Social Networks based on Digital Images and Videos

The electronic images analyzed by the disclosed systems and methods may include, for example, digital photographs and/or frames in a digital video. The content related to an electronic image may include information related to one or more objects detected in the image and/or information identified in metadata associated with the image. The extracted metadata may include information related to and/or describing content in an image. For example, metadata may include a caption to a digital photograph, an audio track accompanying a video, text of a webpage that displays an image, and so forth. As described herein, social network information advantageously may be used to analyze images. Also, the content in an image may, in some implementations, be used to build social networks.

In certain embodiments, relationships among possible members of a social network are determined using information in one or more photos, information determined between photos, and/or information determined between a photograph and associated metadata. Such information may be obtained from uploaded photos and/or by performing a net crawl to retrieve images and/or their associated metadata. For example, users of a social networking website or photo-sharing website may upload images and metadata, and embodiments of the systems and methods herein may be used to analyze the uploaded content.

Relationships between members of a social network may be characterized by one or more networking metrics. For example, some embodiments of the disclosed systems and methods may quantify relationships by a "degree of separation" between individuals in a social network. Other metrics may be used in other embodiments. For example, a "centrality" score may be used to provide a measure of the importance of a member in the network. In some embodiments, relative scores are assigned to members based on the assumption that connections to high-scoring members contribute more to the member in question than equal connections to low-scoring members. Sufficiently high scores may tend to indicate that some members are more central to the social network than other members. In some implementations, metrics may be established to measure the cohesion of members in the network. For example, a "clique" may include members having direct connections to other members, and cohesive "social circles" may include members having differing degrees of indirect connections. In some embodiments, clustering coefficients are used to measure the likelihood that two members associated with a given member are associated with each other. Metrics from network theory and/or graph theory may be used in other embodiments. In certain embodiments of the disclosed systems and methods, the term "picture distance" may be used to refer to a suitable metric for quantifying relationships among members of a social network. For example, in certain embodiments, the picture distance may comprise a degree of separation between members of the network.

In some embodiments, the system (e.g., the system 10 shown in FIG. 1A or the system 40 shown in FIG. 1B) may analyze content related to an image (e.g., image data and/or metadata) to determine a suitable metric in a social network. The content may be extracted from image and metadata using, for example, the image analyzer 20 and the metadata extractor 22 shown in FIG. 1A. The social network analyzer 24 may use the extracted content at least in part to determine social network information such as one or more social network metrics.

Figure 2A:
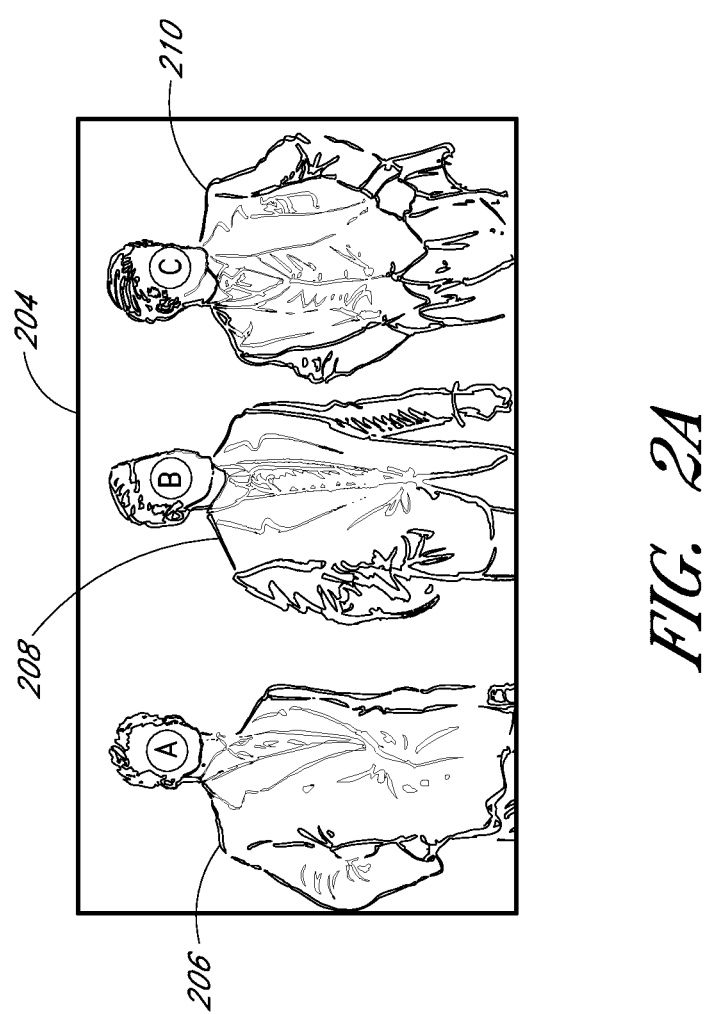
Figure 2B:
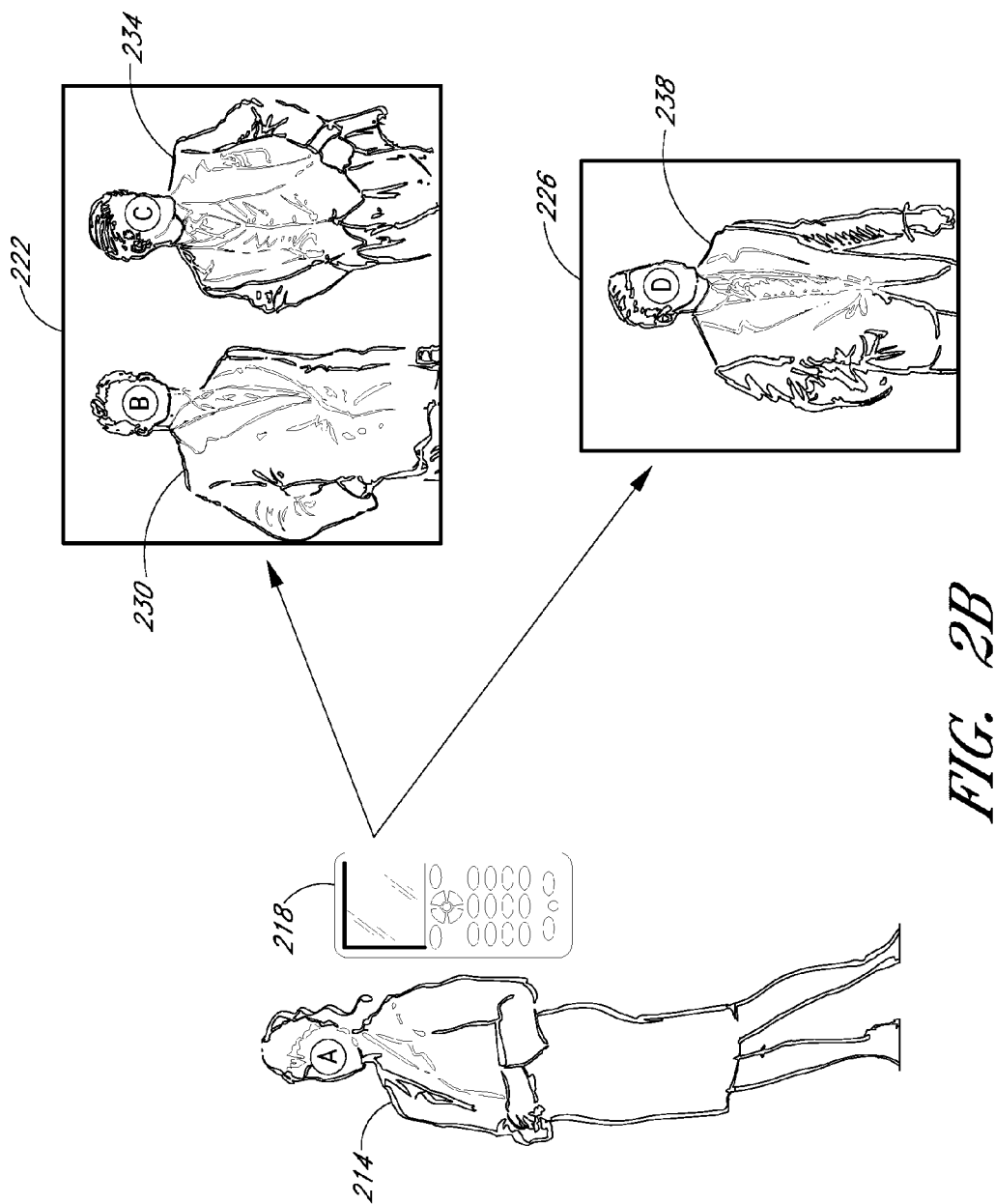

For example, in certain embodiments, a "degree of separation" may be associated among objects (e.g., persons) appearing in an image. FIGS. 2A-2C provide examples indicating the degree of separation in several illustrative cases. These examples are intended to be illustrative and do not restrict the ways in which degrees of separation (or other social network metrics) may be determined. Further, social network metrics among objects may be determined using methods similar to one or more of the following examples and/or using other methods. For example, analysis of a first image and/or metadata may indicate first social network information, and analysis of a second image and/or metadata may indicate second social network information. Comparison of the first and the second social network information may provide additional information among members of one or more social networks.

In a first example, if there are multiple persons (or objects) in the same image, a one degree of separation is established between these persons. For example, FIG. 2A schematically illustrates an image 204 that includes three persons: person A 206, person B 208, and person C 210. Accordingly, there is a one degree of separation between each pair of persons in the image: between person A 206 and person B 208, between person A 206 and person C 210, and between person B 208 and person C 210. Additionally, there is a one degree of separation between each of persons A, B, and C and the person who took the image 204.

In another illustrative example, a person may take (and/or upload) several photographs. As described above, two individuals (if present) in any single photograph will be associated with each other by one degree of separation. Individuals appearing in different photographs taken by the same person will be associated with each other by two degrees of separation. FIG. 2B schematically illustrates an example in which person A 214 uses a digital camera 218 (e.g., in a mobile telephone) to take a first photograph 222 of person B 230 and person C 234 and a second photograph 226 of person D 238. Person B 230 and person C 234 are associated with each other (and with person A 214) by one degree of separation at least by virtue of appearing in the first photograph 222. Person B 230 and person D 238 (and similarly person C 234 and person D 238) are associated with each other by two degrees of separation, because person A 214 took both the first and the second photographs 222, 226.

In another illustrative example shown in FIG. 2C, person A 240 takes a photograph 250 of person C 258. At the same time or at a different time, person B 244 takes a photograph 254 of person C 258. In some cases, person A 240 and person B 244 may use cameras in mobile telephones 218a, 218b to take the photographs 250, 254. Additionally, in some cases, the mobile phones 218a, 218b may be used to upload the photographs 250, 254 to an image analysis system. By virtue of having taken a photograph of the same person (e.g., person C 258), person A 240 and person B 244 are associated through two degrees of separation.

In some implementations, the person who took an image may be identified by metadata associated with the image. For example, if the image was uploaded from a mobile telephone, the identity of the person may be determined from the mobile telephone number. If the image was uploaded by a computer to a network, the identity of the person uploading the image may be determined by a cookie placed on the computer when the photograph was uploaded.

Degrees of separation may be established for persons who use any of the social network services widely available on the World Wide Web. For example, a person having an AOL Instant Messenger (AIM) page (http://www.aim.com) is associated by one degree of separation from all the individuals listed in the person's Buddy Gallery. A person having a MySpace page (http://www.myspace.com) is associated by one degree of separation from all the individuals listed as the person's "friends" on his or her MySpace page.

Degrees of separation may be associated among persons who belong to organizations, companies, clubs, have gone to the same college or school, and so forth. For example, a person listed on a company's web site is one degree of separation from another person listed on that company's web site. Web crawlers may be used to crawl the web to determine social network information available on the World Wide Web.

The above examples of degrees of separation are intended to be illustrative and not to be limiting. For example, any number of objects may appear in an electronic image, which may comprise, e.g., an electronic photograph, an electronic scan of a photograph or picture, an image on a webpage, one or more frames from a video or movie, and so forth. Social network information may be associated between persons in an image, between persons in an image and a person who took or uploaded the image, between persons who took images that include common subject matter (e.g., photographs of the same person), between persons associated through websites, and so forth. Additionally, although the above illustrative examples describe social network information in terms of degrees of separation, in other implementations, other social network metrics may be used (e.g., centrality, cohesiveness, picture distance, etc.).

Relationships determined by the system from content in images (and/or content extracted from associated metadata) may provide one or more of the following possible benefits.

Additional relationships between people (or objects) can be built by leveraging or learning from previously determined relationships. For example, degrees of separation with a value of 2 can be built off of degrees of separation with a value of 1; degrees of separation of 3 can be built off degrees of separation of 2, and so on. As schematically illustrated in FIG. 1A by the feedback paths 30 and 32, embodiments of the system 10 may utilize predetermined social network data to identify people in newly uploaded electronic content 14 and may then augment the social network data stored in the repository 28 to build further links in the social network. Also, as schematically illustrated by the feedback path 49 in FIG. 1B, possible people matches 48 to faces detected in electronic content 14 can be used to augment the people database stored in the storage system 42.

As an illustrative example of building a social network, suppose person A took a photograph of person B. Embodiments of the system may determine that information relating to person B exists in the people database, for example, via his or her image on a MySpace or AIM page. The friends or buddies of person B that are displayed on person B's MySpace or AIM page may be identified by the system to be two degrees of separation from person A.

In some implementations, relationships determined by the system from images and/or extracted metadata may also be used to narrow a search for a person. Some non-limiting examples include the following.

A user of the system can search for those people separated from the user by a certain picture distance threshold. For example, a user may request information on only those individuals who are within a picture distance of two. In some embodiments, the social network analyzer 24 accesses the repository 28 of social network data to determine the identity of the individuals within the picture distance threshold and returns the results to the user.

In certain implementations, the system comprises a graphical user interface that allows a user to create a "picture wall." In certain such implementations, the user can use a pointing device (e.g., a mouse) to click a photograph on the picture wall, and the system will display only those images that are within a certain picture distance (e.g., one) from that photograph.

In some embodiments, the system can be used to search for those individuals associated with a particular geographical region. For example, geographic information may be obtained by associating the area code from the mobile phone number used to input an image to the system with the image itself.

Relationships determined between images and/or between people can be used by the system to increase a confidence factor or confidence score associated with the identification of a person in an image. In some embodiments, the system (e.g., the system 10 of FIG. 1A or the system 40 of FIG. 1B) may determine such relationships to improve the accuracy of a face recognition application (e.g., the facial recognition scoring module 44). For example, if it is known that a particular person is associated with a particular group of people, a ranking algorithm for possible people matches can be modified to increase the ranking of the members within that particular group. Some nonlimiting examples include the following.

Figure 3:
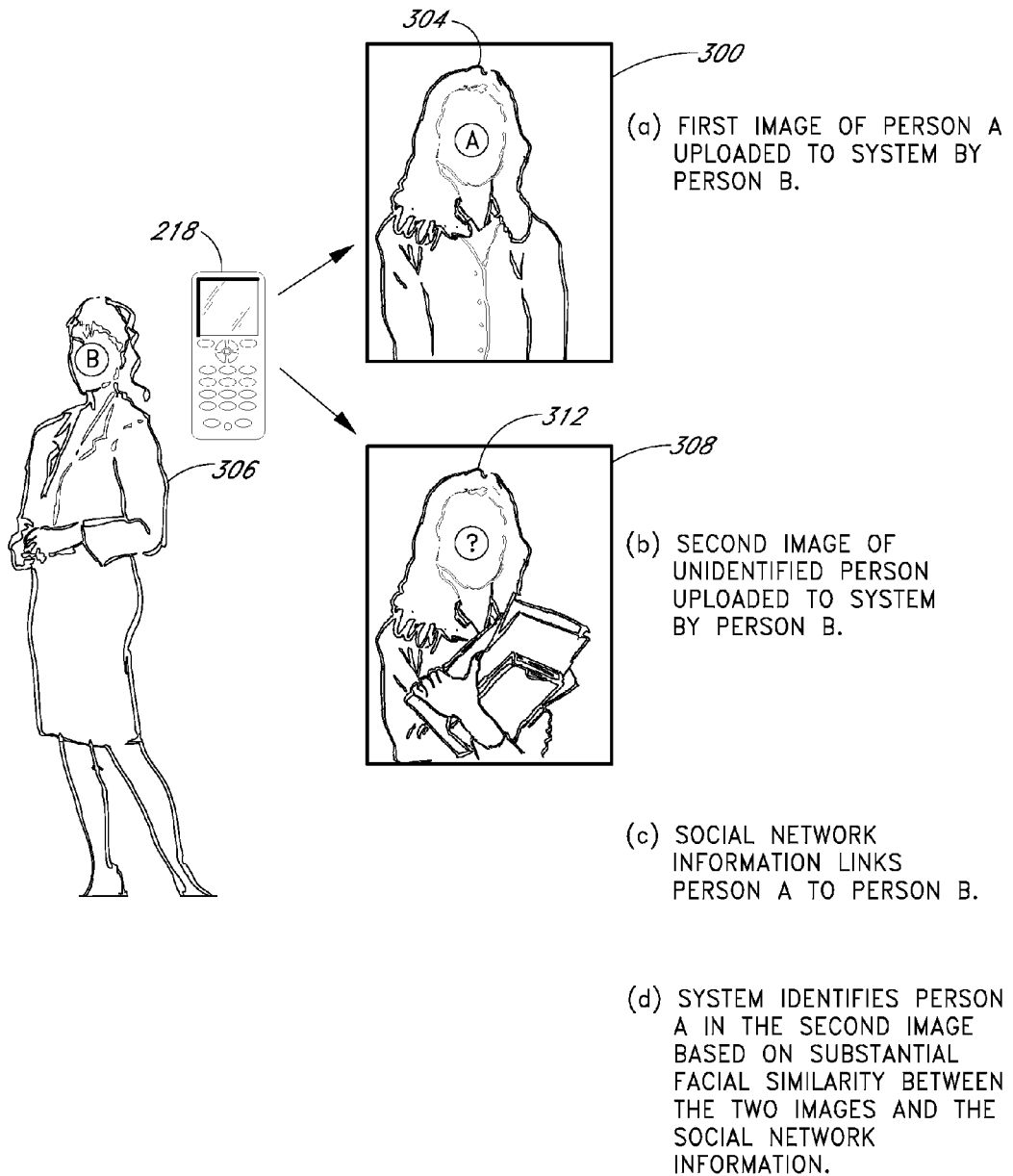
FIG. 3 provides an illustrative example for how social network information may be used to increase the likelihood of correct identification of an unidentified person in an image.

FIG. 3 shows an example in which person A 304 uploads a first image 300 to an image analysis system (e.g., the systems 10, 40 shown in FIGS. 1A, 1B). The first image 300 is a digital photograph of person A 304. Person B 306 uploads a second image 308 including an unidentified person 312. The system determines social network information linking person A 304 and person B 306. For example, the people database may be searched to determine that person A 304 and person B 306 have a direct relationship with each other (e.g., they are within one degree of separation). In some embodiments, the system uses a face recognition algorithm to determine substantial facial similarity between person A 304 in the first image 300 and the unidentified person 312 in the second image 308. For example, the facial recognition scoring module 44 may establish a first facial recognition score (e.g., a confidence factor) based on the substantial facial similarity. Because the system has determined a social network relationship exists between person A 304 and person B 306 (e.g., they are separated by one degree of separation), in some embodiments, the system may increase the first facial recognition score to a second, higher score to reflect the increased confidence of the identification of person A 304 as the unidentified person 312 in the second image 308. Further, if there are additional identified persons in the first image 300, these persons can be associated with two degrees of separation to person B 306 due to the one degree of separation between person A 304 and person B 306.

The example shown in FIG. 3 may be extended to a case in which person A 304 and person B 306 do not have a direct social networking relationship with each other (e.g., one degree of separation). For example, person A 304 may belong to a California chapter of a national organization, and person B 306 may belong to a Virginia chapter of the same national organization. Assume that person A 304 knows the president of person A's chapter, person B 306 knows the president of person B's chapter, and the two presidents of the different chapters know each other from national chapter meetings. In this example, person A 304 and person B 306 are a picture distance of 3 from each other. Person B 306 may utilize an embodiment of the system that provides a search for information about the unknown person 312 to within a particular picture distance from person B 306. A system embodiment that provides searching capabilities to a subset of images within a threshold picture distance (e.g., 3) advantageously may, with higher probability, determine that the unidentified person 312 in the second image 308 may be person B 304.

In other embodiments, even if the system does not restrict the search for information to a threshold picture distance (e.g., 3), the system advantageously may automatically assign higher weights (or probabilities) to those individuals that are a picture distance of 3 (say) or less from person B 306 compared to individuals that are more than a picture distance of 3 from person B 306. Accordingly, such embodiments of the system advantageously may obtain a higher probability of correct identification of person B 304 as the unidentified person 312. The picture distance threshold in the above-described embodiments may be user-selectable and/or machine-selectable. In some embodiments, the picture distance threshold may be dynamically adjustable based on the results of the search. For example, in some embodiments, the system will search to a picture distance of 1, and if no matches are found, the system will continue the search to a picture distance of 2, and so forth. In various embodiments, the picture distance threshold may be selected to reduce the computation processing load of the system and/or to reduce the number of "hits" in a search.

Accordingly, in certain embodiments, social network information can be used as an input to the system to help increase the accuracy of a face recognition algorithm. In certain embodiments, additional information may be used by the face recognition system such as, for example, face feature vector information, time of day, geographic location, and other information such as age, gender, ethnicity, nationality, etc. For example, the data repository 28 shown in FIG. 1A may be used to store such additional information, and the social network analyzer 24 may utilize this additional information in combination with the data from the image analyzer 20 and the metadata extractor 22. In some implementations, such additional information may be stored in one or more data repositories other than the repository 28. Further, in some embodiments, information determined by the system shown in FIG. 1A is output to and used by other systems that have been configured to use such additional information. Many variations are possible.

D. Identifying Individuals Using Metadata Associated with an Electronic Image In some embodiments, the system (such as the systems 10, 40 shown in FIGS. 1A, 1B) may determine information about an individual based on an electronic image of that individual. The information may be determined from metadata associated with the image. For example, the metadata may comprise a caption to a digital photograph and/or information on a webpage on which the photograph appears. In an embodiment for analysis of videos, the metadata may be associated with an audio track of the video. Embodiments of the system may utilize a voice recognition algorithm to identify information from the audio track.

Information extracted from metadata (e.g., by the metadata extractor 22) may include a name (or other identifying properties) of the individual, a gender, an ethnicity, and/or a social network that likely includes the individual. In various implementations, an image can be obtained from a camera on a mobile phone, by selection of a picture from a hard drive on a computer, by input of an image to a website by a user. In some embodiments, images may be input into the system via uploading the image via a data network. In various embodiments, systems may include modules that utilize a face detection algorithm, a face recognition algorithm, a text recognition algorithm, a voice recognition algorithm, and/or a combination of such algorithms to determine suitable information from the image and/or image metadata. In some implementations, the system uses web crawling to find and analyze images and/or metadata. Many other technologies may be used in other embodiments of the system.

In some embodiments of the system that use face recognition technology, the system can associate a person in a digital photograph with a person already included within a "people database." For example, the people database may be stored on the data repository 28 shown in FIG. 1A or the storage system 42 shown in FIG. 1B. In order to build up or seed the people database with people and their corresponding information, some embodiments use a web crawling tool to crawl the World Wide Web for images that include one or more persons. The web crawling tool may obtain corresponding metadata about the persons in the image. In some embodiments, the system analyzes an image and extracted metadata under the assumption that a name (or other identifying information) of an individual is not included within the image but is included in metadata associated with the image. In some embodiments, the system may analyze the images and/or metadata associated with the image to associate one or more individuals in the image with corresponding identification information (e.g., names, labels, and/or identification tags). In certain embodiments, the system determines a confidence factor or confidence score associated with the likelihood of a correct association between the individual in the image and the corresponding identification information. The system may update the confidence score based on extracted metadata and/or social network information. In some embodiments, the system uses an iterative process in which previously known social network information is used to analyze image content and to determine additional social networking links. The social network database can be updated and then used again to further analyze the content in the image.

Some or all of the following example methods advantageously may be used by the system to determine an association between an individual in an image and extracted metadata (e.g., a face-name connection). In some example methods, only images in which a face has been detected by a face detection algorithm are input into the system. The following examples are intended to be illustrative and are not intended to limit the scope of the methods that can be used by the systems described herein.

Figure 4A:
FIG. 4A is an example of an image with one face and metadata (a caption) having one corresponding name.

FIG. 4A is an example of an image with one face and a caption having one corresponding name ("Sarah Richards"). In some cases, the caption is not included with the image but is included as metadata associated with the image. For those images in which only one face has been detected, associated metadata (e.g., a caption) may be searched to look for one or two words that may signify a name. Indications of the name may be, for example, a word with an initial capital letter. The metadata extractor 22 may extract the name (or names, e.g., first name "Sarah" and last name "Richards") from the caption. The extracted name and detected face may be associated with each other (e.g., to establish a face-name connection). For example, a feature vector representing the face may be associated with the extracted name.

FIGS. 4B-4E show examples of images where multiple people are included in the image. Metadata (e.g., a caption and/or associated web page text) may provide information about the identities of the multiple people in the image. Various cases are possible, and an embodiment of an image analysis system may use some or all of the following examples to correlate images and metadata.

Example Case 1

If the number of faces in the image corresponds to the number of names extracted from the metadata, the system may use one or more of the following to associate extracted names with detected faces.

Figure 4B:
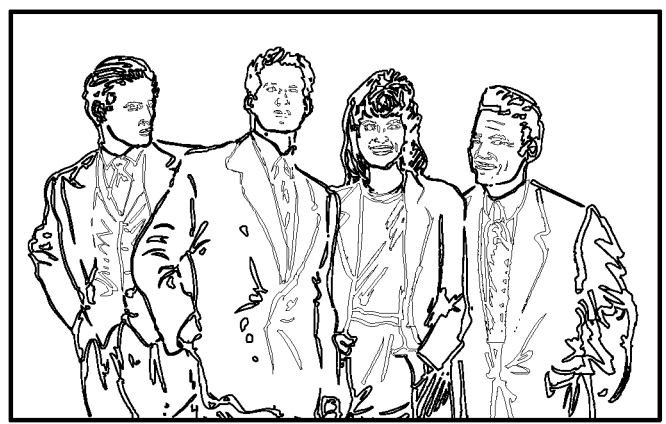
FIG. 4B is an example of an image with multiple persons and a caption listing the names of the four persons together with location key words (e.g., "front row, center").
Figure 4C:
FIG. 4C is an example of an image with two persons and a caption listing the names of the two person in the same order in which they appear in the image.

(i) Text that includes certain key words such as "left", "right", "center", "top", "bottom", "front", "back", "middle", "upper", "lower", etc. may be analyzed and used to correlate a face with the corresponding name. FIG. 4B is example of an image that contains multiple individuals (in this case 4 individuals), and the associated caption includes the corresponding individual's names together with key words (e.g., "front row, center" and "back row, from left to right").

(ii) For those images where some or all of the above key words are not detected, a face recognition algorithm may be used to determine which face belongs to which person. For example, the system may identify individuals in an image by using face recognition techniques on other identified individuals in the same image. With reference to the example shown in FIG. 4C, if the system determines that there are two people in an image, and the system determines there are two names in the associated caption (e.g., "Sally Axley" and "George Brown"), then if the system can determine that one individual is (or is likely to be) Sally Axley by using facial recognition with a previous face-name connection, then the system may determine that the other person in the photograph is likely to be George Brown. In the example shown in FIG. 4C, the extracted names are in the same order as the detected persons in the image (e.g., Sally Axley is to the left of George Brown in both the image and the caption). Some embodiments may utilize the order of extracted names to increase the confidence that individuals in an image are correctly identified.

(iii) In additional to the use of facial recognition techniques as described in (ii), there are a number of other aspects associated with individuals that a system can use additionally or alternatively to help associate multiple people within one photograph with their corresponding names in metadata. These aspects include demographic data, e.g., gender, ethnicity, nationality, and/or race, which can be determined through various well-known techniques. Example of such techniques include:

(iii-a) Image Analysis Techniques: A gender, ethnicity, nationality, and/or race classifier may be based at least in part on image-based information.

(iii-b) Text-based Techniques: Text-based information associated with the image (e.g., caption text and/or webpage text) can be used to obtain information about a person. With respect to gender, there are a number of ways in which this aspect about an individual may be determined. For example, if a webpage contains both text about an individual as well as the person's image, there may be words such as "he", "him", "his", etc. that indicates the gender of the person (in this case, as a male).

(iii-c) If a number of individuals is detected in an image and the system identifies the same number of associated names (see, e.g., the two individuals and two names shown in FIG. 4C), the system may use the names to provide an indication as to gender. For example, if one name is (traditionally) female, such as "Sally," and the other name is (traditionally) male, such as "George," then if the system determines that one individual is female and the other is male (e.g., via any of the techniques described in (a) and (b) above), the system can associate the names in the caption with the correct person in the image using such gender-related information. The system may use lists of common male and female names to implement this feature.

(iii-d) If two individuals are detected within an image, the system may determine that one or more names are likely associated with particular ethnicities and/or nationalities. For example, the system may determine that one name is Asian and the other name is Caucasian by, e.g., checking the names against a database of names for different nationalities and/or ethnicities. Then if one person in the image is identified by the system as being Asian and the other as being Caucasian, (e.g., via any of the techniques described in (a) and (b) above), the system can identify (or increase the likelihood of identification) of who is who in the image using this ethnicity/nationality-related information.

Example Case 2

If the number of faces in the image does not correspond to the number of names extracted from the metadata, the system may use one or more of the following to associate extracted names with detected faces.

Figure 4D:
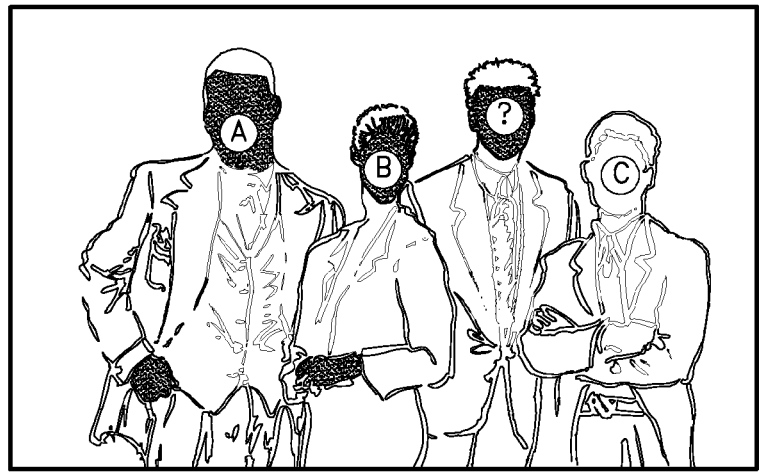
FIGS. 4D and 4E are examples in which the image caption does not list the names of all the individuals in the image (FIG. 4D) or all the names are listed but in an incorrect order (FIG. 4E).

(i) In cases where the number of names determined from the metadata does not correspond to the number of faces detected in an image, face recognition techniques can be used to eliminate some possible choices for a name/face pair. For example, in some implementations, those faces that are near matches to a previously identified individual can be removed from the determination of the unknown name/face pair. In other embodiments, face recognition may determine the most probable name/face pair (e.g., via determining a confidence factor or confidence score). For example, FIG. 4D is an image with four persons and a caption with only three names. In addition, in this example, the order of the three names in the caption do not correspond to the order in which the people are situated in the image. In this example, person A is to the left of person B in the image, but the name of person A is to the right of the name of person B in the caption. In certain implementations, facial recognition technology (and/or use of the caption metadata) may be used to identify person A, person B, and person C in the image, thereby leaving only the unidentified person (third from the left) to be identified. Social network information associated with some or all of the identified individuals (persons A, B, and C) may improve the likelihood of an identification of the unidentified person in the image. In the event that this individual remains unidentified, future social network information for persons A, B, and/or C may permit the future identification of this individual. Accordingly, in certain embodiments, the system iteratively analyzes images, metadata, and/or social network data to identify previously unidentified individuals. Based upon subsequent identifications, the social networks linking the identified individuals may be augmented.

Figure 4E:
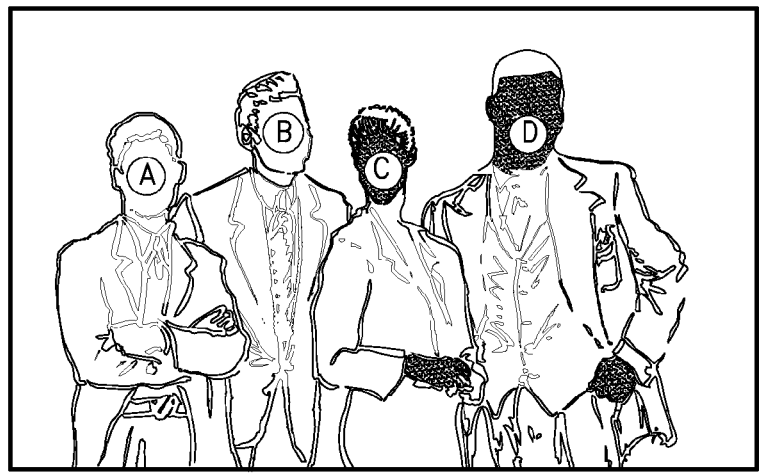

(ii) Additional information may be useful to assist an embodiment of a recognition system with identifying one or more people in an image, such as the example image shown in FIG. 4E. In this example image, person C is an African American female, person B is an African American male, and persons A and D are Caucasian males. The image caption lists the names of the four persons A, B, C, and D in the image; however, the order of the names is incorrect. In certain embodiments, if gender and/or race information can be determined by the system for the individuals in the picture (e.g., using a race and/or a gender classifier), some or all of the persons in the image may be identified (e.g., confidence scores associated with their respective identification may be sufficiently high). For example, race and gender information may permit the identification of person B and person C. If an image of person D exists in the people database, the system may compare the image of person D to the remaining two faces detected in the image shown in FIG. 4E. Based at least in part on the comparison, the system may determine that the person on the right in the image is person D, because person D is a closer match to the people database image than is person A (e.g., a confidence score associated with a match to person D would be substantially higher than a confidence score associated with a match to person A). Having identified three of the four persons in the image, the system may be able to associate the one remaining name in the caption (e.g., person A) with the one remaining unidentified person in this image. Accordingly, the image metadata (caption) may be used to identify the leftmost individual in the image as person A.

Embodiments of the systems described herein may use some or all of the methods disclosed herein to determine associations between individuals. For example, certain embodiments utilize social networking information to increase the likelihood of a person's identification, to limit the scope of a search for a person, etc. as described above.

Certain embodiments of the systems and methods provided herein may be used to identify objects in an image and/or may use the identification of objects in one or more images to identify a person related to an image. For example, a social network between people can be built and/or augmented using information that two (or more) individuals took a picture of the same object, searched for the same object in a web-based image analysis system or social networking site, etc.

Although many of the embodiments and examples described herein relate to digital photographs, this is not a limitation to the disclosed systems and methods. For example, in certain embodiments, one or more frames of a video can be analyzed for detection and/or identification of persons and/or objects. Some embodiments may analyze metadata associated with the video or with particular frames thereof. For example, an audio track to a video (e.g., a soundtrack) may include information that can be used to identify a person or object in the video. System embodiments may utilize voice recognition algorithms to determine names (or other suitable identification information) from the audio track. For example, certain systems analyze frames of the video and/or metadata associated with the video in a window that includes a selected frame of the video in which a person or object is detected. The window may be a time window (e.g., 5 seconds before and/or 5 seconds after the selected frame). The window may be a number of frames (e.g., 120 frames before and/or 120 frames after the selected frame). Many other windows are possible. In certain embodiments, all of the frames and/or all of the associated metadata are analyzed (e.g., the window includes the entire video).

Although the application has described certain preferred embodiments and certain preferred uses, other embodiments and other uses that are apparent to those of ordinary skill in the art, including embodiments and uses which do not provide all of the features and advantages set forth herein, are also within the scope of the disclosure. For example, in any method or process described herein, the acts or operations of the method/process are not necessarily limited to any particular disclosed sequence and may be performed in any suitable sequence. Also, for purposes of contrasting different embodiments, certain aspects and advantages of the embodiments are described where appropriate. It should be understood that not necessarily all such aspects and advantages need be achieved in any one embodiment. Accordingly, certain embodiments may be carried out in a manner that achieves or optimizes one advantage or group of advantages without necessarily achieving other aspects or advantages that may be taught or suggested herein.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Also, the term "or" is used in its inclusive sense (and not in its exclusive sense) so that when used, for example, to connect a list of elements, the term "or" means one, some, or all of the elements in the list. Furthermore, the particular features, structures or characteristics may be combined in any suitable manner in one or more embodiments. Additionally, although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. A computer-implemented method of building a social network based on content in images, the method comprising:
   using, at least one processor, to identify a first person in an electronic image;
   identifying a second person related to the electronic image;
   creating first social network information relating the first person to the second person;
   storing, in a storage device, the first social network information;
   identifying second social network information relating the first person with a third person; and
   creating third social network information relating the second person to the third person based on the relation of the second person to the first person in the first social network information and the relation of the third person to the first person in the second social network information.

2. The method of claim 1, wherein the second person is in the image.

3. The method of claim 1, wherein the second person is related to the image by having taken the image or uploaded the image to a network.

4. The method of claim 1, wherein the first social network information includes a degree of separation between the first person and the second person.

5. The method of claim 1, wherein the third social network information includes a degree of separation between the second person and the third person.

6. The method of claim 5, wherein the second social network information includes a degree of separation between the first person and the third person, wherein the degree of separation between the second person and the third person is greater than the degree of separation between the first person and the third person.

7. The method of claim 1, further comprising:
   identifying a relationship between the first person and a second image;
   using a computer system to detect the third person in the second image;
   creating the second social network information relating the first person to the third person based on the relationship between the first person and the second image and the detection of the third person in the second image; and
   storing, in a storage device, the second social network information.

8. The method of claim 1, wherein the first person is identified based, at least in part, on stored social network information.

9. The method of claim 1, wherein a confidence of an identification of a person in an electronic image is increased based on stored social network information.

10. The method of claim 1, wherein the electronic image is one of a digital photograph or video frame.

11. The method of claim 1, wherein the first social network information includes a centrality measure of an importance of the first person in a social network.

12. A computer-implemented method of building a social network based on content in images, the method comprising:
   using, at least one processor, to identify a first object in an electronic image;
   identifying a second object related to the electronic image;
   creating first social network information relating the first object to the second object;
   identifying second social network information relating the first object with a third object; and
   creating third social network information relating the second object to the third object based on the first social network information and the second social network information.

13. The method of claim 12, wherein the first object is a first person.

14. The method of claim 12, wherein the first object is a first person, the second object is a second person, and the first social network information comprises a picture distance between the first person and the second person.

15. The method of claim 12, wherein the second object is a second person.

16. The method of claim 12, wherein the first object is identified based, at least in part, on stored social network information.

17. The method of claim 12, wherein a confidence of an identification of an object in an electronic image is increased based on stored social network information.

18. The method of claim 12, wherein the electronic image is one of a digital photograph or video frame.

19. The method of claim 12, wherein the first social network information includes a centrality measure of an importance of the first object in a social network.

20. A system for building a social network based on content in images, the system comprising:
   at least one storage device storing instructions; and
   at least one processor that, when executing the instructions, is configured to:
      identify a first person in an electronic image;
      identify a second person related to the electronic image;
      create first social network information relating the first person to the second person;
      identify second social network information relating the first person with a third person; and
      create third social network information relating the second person to the third person based on the relation of the second person to the first person in the first social network information and the relation of the third person to the first person in the second social network information.

* * * * *